Nov. 18, 1969  R. D. DUBBLE ET AL  3,479,208
METHOD AND MEANS FOR SURFACE COATING GLASSWARE
Filed Sept. 13, 1966

INVENTOR.
ROGER D. DUBBLE
BY ERBY ORTON

ATTORNEY

United States Patent Office 3,479,208
Patented Nov. 18, 1969

3,479,208
METHOD AND MEANS FOR SURFACE COATING GLASSWARE
Roger D. Dubble, Lancaster, Ohio, and Erby Orton, Salem, N.J., assignors to Anchor Hocking Corporation, Lancaster, Ohio, a corporation of Delaware
Filed Sept. 13, 1966, Ser. No. 579,098
Int. Cl. B05b *13/02, 13/06;* B05c *7/02*
U.S. Cl. 117—94         10 Claims

ABSTRACT OF THE DISCLOSURE

A method and means for surface coating of glassware moving on a conveyor. The glassware is tilted successively backwardly and forwardly as it moves beneath the spray coating nozzle by an enlarged roller beneath the conveyor and this tilting motion insures complete coating of the glassware side walls. Reflecting means is positioned beneath the perforate conveyor to redirect spray onto the lower surfaces of the glassware.

---

The present invention relates to the manufacture of molded glass articles and more particularly to the application of a sprayed-on protective coating to such articles.

Glass articles of various types and particularly glass containers such as jars and bottles and the like are now manufactured in high-speed molding or forming operations and the articles thus formed are passed at high speeds through subsequent annealing, packing, or other handling operations and thence through filling, sealing, and labeling machinery.

It has been common practice to apply a lubricating coating to the outer surfaces of such glass articles to facilitate their handling through the various operations. The earlier coatings such as silicone or stearate sprays provided sufficient lubrication for the speeds previously used. A continually increasing demand for glass containers and similar glass articles and a related increase in the speed of handling them both during their manufacture and subsequent handling has made increases in article handling speeds necessary. To facilitate these increasing speeds and to protect and lubricate the glass articles during this handling, improved protective coatings including two layer coatings have been developed. It has been found that these coatings when applied over the exposed surfaces of the glass articles in uninterrupted coatings of relatively uniform depth enable the high article handling speeds to be realized as the protective coatings effectively applied significantly reduce article jamming, scratching and breaking.

A spray coating apparatus has been developed and used for applying these coatings and particularly for use in connection with the relatively wide article conveyor belts which are normally used to remove the formed and annealed glass articles from the glass annealing lehrs.

This apparatus has not been fully effective in applying uniform coatings over the necessary areas of the glass articles and particularly has not been fully effective for open mouth containers such as bottles and jars. Problems have arisen due to the failure of the spray apparatus to cover critical areas particularly the article bottom portions resulting in article damage and in addition objectionable amounts of the coating have been sprayed into the interiors of the open containers. The presently used apparatus also has required relatively critical adjustments in attempting to minimize the above deficiencies and has necessitated frequent readjustment and frequent checking of the container coatings.

The present invention provides an improvement in spray apparatus of this type and particularly improves the coverage of the coating and minimizes the undesired entry of the spray into the containers. These results are obtained by an improved spray system conveyor structure as will now be described.

Accordingly, an object of the present invention is to provide an improved method and means for applying a protective coating to articles.

Another object of the present invention is to provide an improved spray means for coating open mouth articles.

Another object of the present invention is to provide a more efficient method and means for spray coating open mouth articles.

Another object of the present invention is to provide an improved method of spray coating open mouth containers.

Another object of the present invention is to provide a more efficient method and means for conveying articles in a spray coating device.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

The improved article spray means of the present invention will be described in connection with a typical spray nozzle mounting means and its improved operation will be indicated in particular with open mouth containers. It is clear, however, that the article support means in accordance with this invention may be used with a variety of spray nozzles and articles in both fixed and moving mountings and where relative movement between the spray nozzles and the articles being sprayed may be provided by a moving spray head or moving articles, or a combination of spray nozzle and article motion.

The spray head or nozzle itself will be described only insomuch as is necessary for an understanding of its cooperation with the improved article support or conveyor. Suitable spray devices of this type are described, for example, in U.S. Patent No. 2,246,502, which describes a reciprocating spray device for use with a moving conveyor, or in Patents Nos. 2,281,169 and 2,448,519, which describe driven spray devices whose motion above the sprayed articles is controlled by suitable photocells.

Figure 1:
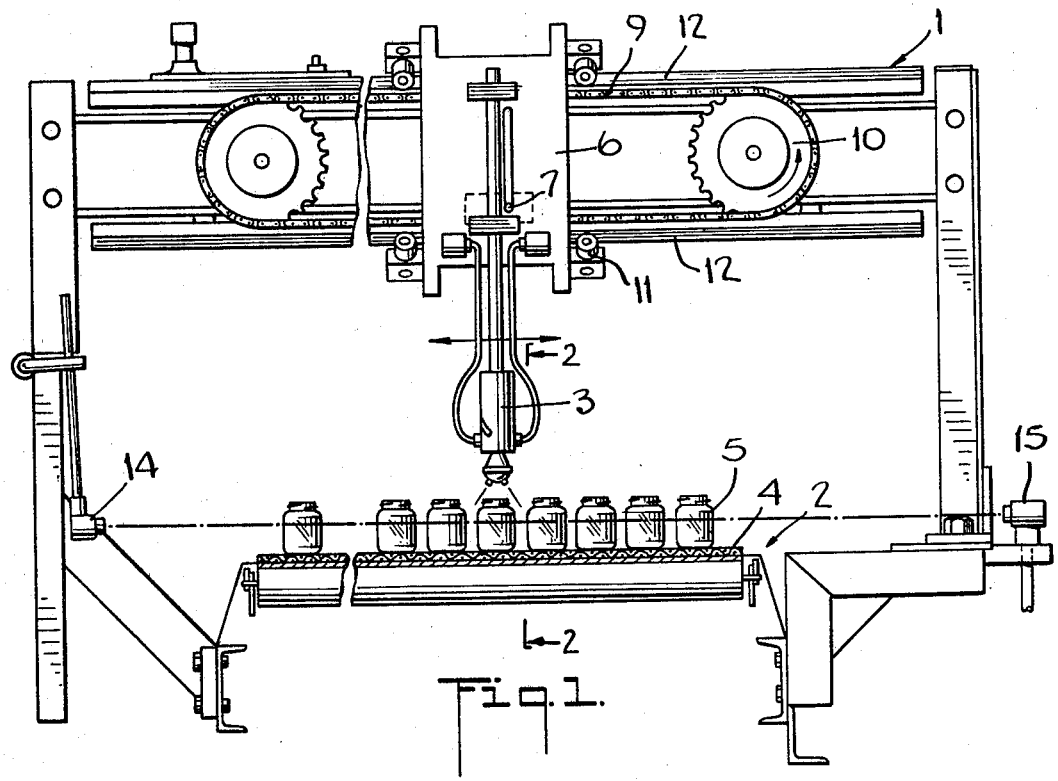
FIG. 1 is a vertical sectional view of a spray device including a preferred embodiment of the article conveyor in accordance with the present invention.

FIG. 1 illustrates a spray apparatus 1 embodying an article support and conveyor device 2 in accordance with the present invention and having a typical spray nozzle 3 mounted above the support device 2 for transverse motion across a moving belt conveyor 4 ad above open mouth containers 5 arranged in rows generally parallel to the directions of the nozzle 3 motion. The carriage 6 for spray nozzle 3 is provided with its transverse motion across the conveyor belt 4 by being pivotally attached at 7 to a link of the moving chain 9. As the chain 9 rotates on its spaced end sprockets 10, the nozzle 3 and its supporting carriage 6 will move back and forth on its support wheels 11 on the transverse tracks 12. A photocell 14 and a cooperating source of light 15 are illustrated which may be used to start and stop the movement of the nozzle carriage 6 in the manner described in the above Patents Nos. 2,281,169 and 2,448,519.

Spray nozzle supports of the general type as illustrated above may include means as suggested in Patent No. 1,929,896 for causing the nozzle carriage 6 path to be angled across the moving conveyor 4 to compensate for the forward motion of the rows of containers 5 and to thereby retain the nozzle 3 between the rows. In this case means is provided for shutting the nozzle off at the far side of the conveyor 4 for its return movement and for turning it on at the start of the next pass. This means may comprise a nozzle control switch means and activating cams with either the switch means or the cams mounted on the carriage 6 and with the other elements mounted at opposite ends of the tracks 12. Since the photocell control devices and the spray controls are commercially available on spray nozzles and spray nozzle mountings they need not be described further herein.

A typical conveyor belt 4 carries the articles 5 beneath the spray nozzle 3 and in order to be sufficiently flexible for being mounted on suitable end rollers these belts are formed of flexible material and a preferred belt material comprises a steel wire mesh with an open weave or pattern providing the necessary flexibility and which is also capable of withstanding the heat to which the conveyor belt will be subjected in the event portions of the belt are used to carry the hot glass articles through heated annealing lehrs.

Figures 2, 3:
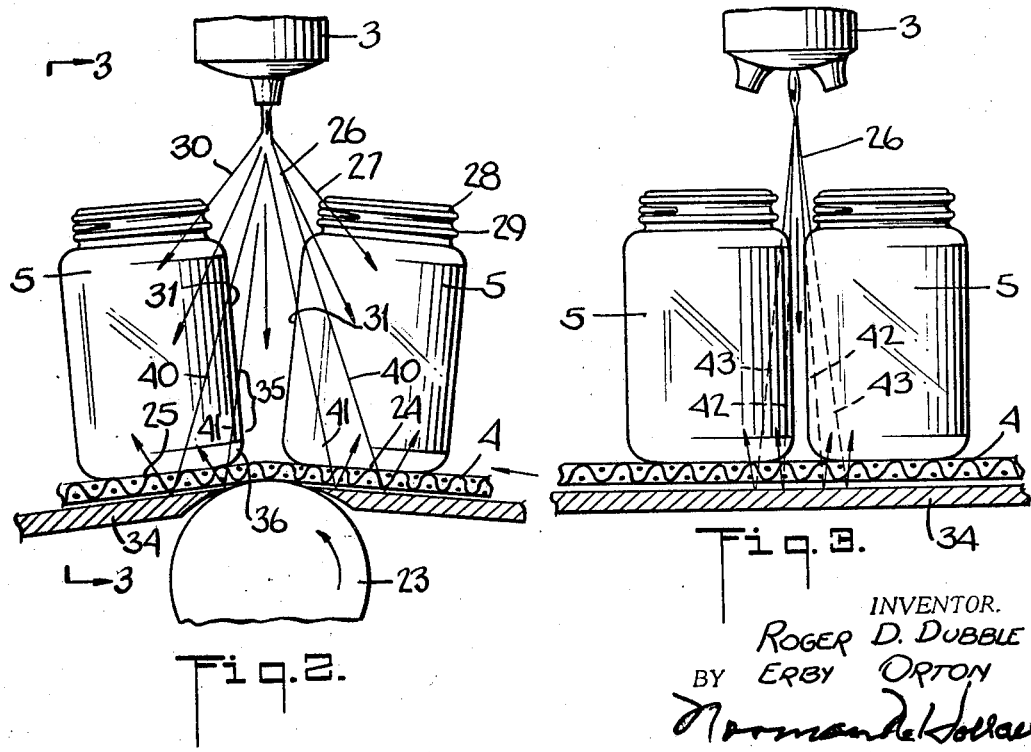
FIG. 2 is an enlarged detailed sectional view of the device of FIG. 1 taken along line 2—2 on FIG. 1.
FIG. 3 is a vertical sectional view of the device of FIG. 2 taken along line 3—3 of FIG. 2.

FIG. 2 illustrates in detail the improved spray belt mounting of the present invention wherein a raised guide means such as the roller 23 is provided immediately beneath the spray nozzle 3 and which results in an upwardly inclined portion 24 of the belt 4 in advance of the spray nozzle 3 and in a downwardly inclined portion 25 beyond the nozzle 3. As illustrated in FIG. 2, this causes the containers 5 to tilt backwardly as they approach the spray 26 from the nozzle 3. This results in a significant decrease in the angle between the paths of the spray droplets and the plane of the open container mouths. This is shown, for example, by the line 27 which illustrates the general path of the outermost spray droplets and is seen to result in the spray droplets striking the jar mouth 28 with an increased angle of incidence with respect to the container finish 29 thereby improving the coating of the container 5 in this area and correspondingly reducing the penetration of the spray through the open mouth of the container 5.

A similar advantage in the angular relation between the departing jar 5 and the path of the outermost spray droplets results as illustrated by line 30 showing the general direction of these droplets.

Similar advantages are also obtained throughout the length of the container sidewalls 31 by an increase in the angle at which the droplets strike the sidewalls 31 resulting in a better retention of the spray material on container sidewalls 31 and in the formation of a more uniform coating of a controlled depth even for extremely short exposure times of the container 5 to the spray.

An additional and cooperating improvement is provided by the location of reflector plates 34 positioned beneath the spray pervious conveyor 4 and preferably inclined at a similar angle to the related portions of the conveyor. These plates 34 are seen to re-direct the spray droplets against the lowermost portions of the containers 5 particularly around a cylindrical zone illustrated generally by the bracket 35 and also onto the rounded bottom areas 36. While the areas 36 will not normally contact other articles or the article conveyor surfaces, these rounded portions do come into contact with various raised projections or other portions of the article conveyors of differing levels during the transfer of the articles from one conveyor to another or onto or off of various supports or pads or other members during the different article handling operations such as testing, lining, filling, labeling and so forth. The presence of an effective protective and lubricating coating on these rounded areas 36 minimizes the effect of such minor variations in the container support and transferring means levels to further minimize any slowdowns, jamming or related scarring, scratching, or breaking of containers being handled at high speeds. Lines 40 and 41 as illustrated in FIG. 2 and lines 42 and 43 in FIG. 3 illustrate generally the direction of spray droplets in the spray patterns and the reflection or redirection of portions of these droplets as they strike the plates 34. The reflection of the spray droplets by the plates 34 may result in a further scattering or break-up of the spray droplets, however, a substantial portion of the reflected spray will move in the general direction illustrated by the lines 40–43 as described above to provide the improved coating.

It will be seen that an improved method and means for spray coating articles has been provided which is particularly useful for molded class articles including open mouth containers and where improved coating coverage is obtained together with coatings of more uniform depth. The arrangement is particularly useful with the open mouth containers as the improvements in the coating of the outer surfaces are accompanied by a significant reduction of the undesirable spraying of the insides of the containers. In addition, the cooperating spray reflecting means provides for corresponding improvements in the uniformity and depth of the spray coatings on the lowermost portions of the articles adjacent to the support or moving conveyor. These improvements are obtained by means of the significant but relatively easily accomplished changes or improvements made as described on otherwise conventional spray equipment.

What is claimed is:

1. In glass coating apparatus including a spray nozzle mounted for lateral movement above an article conveyor for coating moving rows of glass containers the improvement which comprises a flexible, perforate article conveyor belt adapted for being coupled to a conveyor drive, means for supporting said conveyor belt with generally horizontal runs at the portions approaching and leaving the spray nozzle, means for raising the level of the conveyor belt intermediate said horizontal runs and beneath said nozzle above the level of the horizontal runs whereby the rows of containers are tilted successively backwardly and forwardly as they move beneath the moving nozzle and whereby the tops of the containers are tilted away from the spray issuing from the nozzle, and spray reflecting members positioned beneath said conveyor and adjacent to said conveyor raising means.

2. The apparatus as claimed in claim 1 in which said means for raising the conveyor comprises a conveyor support roller.

3. In glass coating apparatus including a spray nozzle positioned above an article conveyor the improvement which comprises a spray pervious flexible article conveyor belt adapted for being coupled to a conveyor drive and means positioned beneath said conveyor for reflecting spray passing through said conveyor upwardly toward articles on said conveyor.

4. The apparatus as claimed in claim 3 in which said reflecting means comprises members inclined successively upwardly and downwardly in the direction of conveyor movement.

5. The apparatus as claimed in claim 3 which further comprises a support roller mounted in rolling engagement with said conveyor and intermediate said inclined members, and positioned for raising the engaged portion of the conveyor above the adjacent portions.

6. The method of spray coating rows of open mouth containers which comprises the steps of moving the rows of containers, directing a moving spray of the coating material generally downwardly onto the rows of moving containers, successively tilting the containers backwardly and forwardly as they move past the spray, and reflecting the spray upwardly onto the lowermost portions of the moving containers.

7. The method as claimed in claim 6 which further comprises the step of moving the articles in transverse rows, and in which the tilting is of the successive rows of articles.

8. The method of spray coating glass containers having lower portions of reduced size which comprises the steps of moving the containers on a perforate conveyor belt, directing a spray generally downwardly onto the moving containers, and reflecting a portion of the spray from beneath the conveyor belt and the containers upwardly against the lower portions of the containers.

9. The method as claimed in claim 8 which further comprises the steps of successively tilting the containers backwardly and forwardly as they are moved past the spray.

10. The method as claimed in claim 8 which further comprises the steps of moving the containers in spaced transverse rows and successively tilting each row backwardly and forwardly as the rows are moved past the spray.

References Cited

UNITED STATES PATENTS

| 2,926,101 | 2/1960 | Schaefer | 118—324 X |
| 3,014,451 | 12/1961 | Rhodes | 118—24 |

FOREIGN PATENTS

| 708,491 | 7/1941 | Germany. |

ALFRED L. LEAVITT, Primary Examiner

C. R. WILSON, Assistant Examiner

U.S. Cl. X.R.

117—105.3; 118—323, 324